(12) United States Patent
Farshteindiker et al.

(10) Patent No.: US 11,811,802 B2
(45) Date of Patent: Nov. 7, 2023

(54) CLOUD SECURITY MONITORING OF APPLICATIONS IN PAAS SERVICES

(71) Applicant: MICROSOFT TECHNOLOGY LICENSING, LLC., Redmond, WA (US)

(72) Inventors: Benyamin Farshteindiker, Petah Tiqwa (IL); Assaf Israel, Ganey Tikva (IL); Tomer Weinberger, Tel Aviv (IL)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 587 days.

(21) Appl. No.: 16/999,614

(22) Filed: Aug. 21, 2020

(65) Prior Publication Data

US 2022/0060490 A1 Feb. 24, 2022

(51) Int. Cl.
*H04L 9/40* (2022.01)
*G06F 9/455* (2018.01)
*G06F 9/50* (2006.01)

(52) U.S. Cl.
CPC ...... *H04L 63/1425* (2013.01); *G06F 9/45558* (2013.01); *G06F 9/5077* (2013.01); *H04L 63/1416* (2013.01); *G06F 2009/45591* (2013.01); *G06F 2009/45595* (2013.01)

(58) Field of Classification Search
CPC ............. H04L 63/1425; H04L 63/1416; H04L 63/1458; G06F 9/45558; G06F 9/5077; G06F 2009/45591; G06F 11/3006; G06F 11/302; G06F 11/3447; G06F 2201/81; G06F 2201/865; G06F 21/554; G06F 21/552
See application file for complete search history.

(56) References Cited

U.S. PATENT DOCUMENTS

| | | | | |
|---|---|---|---|---|
| 8,473,444 | B1* | 6/2013 | McCarten | H04L 63/0263 706/47 |
| 10,805,332 | B2* | 10/2020 | Gunda | H04L 63/1433 |
| 10,936,717 | B1* | 3/2021 | Herman Saffar | G06F 9/45558 |
| 2010/0229239 | A1* | 9/2010 | Rozenberg | G06F 21/552 726/24 |
| 2016/0006633 | A1* | 1/2016 | Kimura | H04L 41/0813 709/224 |
| 2019/0173903 | A1* | 6/2019 | Muthukrishnan | H04L 67/01 |
| 2019/0213099 | A1* | 7/2019 | Schmidt | G06N 3/044 |

(Continued)

OTHER PUBLICATIONS

Anand, et al., "Resource Usage Monitoring for KVM based Virtual Machines", In Proceedings of 18th International Conference on Advanced Computing and Communications, Dec. 14, 2012, 5 Pages.

(Continued)

*Primary Examiner* — Lynn D Feild
*Assistant Examiner* — Abdullah Almamun

(57) ABSTRACT

A security threat detection system is used to monitor the physical resource usage of a hosted application in a PaaS service in order to detect anomalous behavior indicative of a security threat. The system analyzes the historical usage of the application's physical resources in order to determine the normal range of consumption of a resource by the application. A security threat alert is then provided when the application's resource consumption exceeds the normal range of consumption.

20 Claims, 6 Drawing Sheets

(56) References Cited

U.S. PATENT DOCUMENTS

| | | | |
|---|---|---|---|
| 2019/0377871 A1* | 12/2019 | Park | G06F 21/552 |
| 2021/0099478 A1* | 4/2021 | Seetharamaiah | H04L 63/14 |
| 2021/0117306 A1* | 4/2021 | Somashekar | G06F 11/3612 |
| 2021/0357509 A1* | 11/2021 | Kamble | G06F 16/9566 |
| 2022/0207148 A1* | 6/2022 | Rozas | G06F 9/30076 |

OTHER PUBLICATIONS

Jayathilaka, et al., "Detecting Performance Anomalies in Cloud Platform Applications", In Journal of IEEE Transactions on Cloud Computing, vol. 8, Issue 3, Jul. 2020, pp. 764-777.

"International Search Report & Written Opinion issued in PCT Application No. PCT/US21/030991", dated Aug. 16, 2021, 12 Pages.

* cited by examiner

CLOUD SECURITY MONITORING OF APPLICATIONS IN PAAS SERVICES

BACKGROUND

Cloud computing services provide powerful environments for customers to develop, run and manage web applications without the complexity of building and maintaining any infrastructure typically associated with developing and launching the applications. Examples of cloud computing services include Infrastructure as a Service (IaaS), Platform as a Service (PaaS) and Software as a Service (SaaS). Each of these services has its own benefits and differences.

SaaS service is a centralized software hosting service where a cloud provider licenses software that is hosted by the cloud provider on a subscription basis. The SaaS applications are typically accessed through a web browser and the SaaS service acts as a web delivery service for the application. SaaS is advantageous for companies and employees since it eliminates the time and expense of installing, managing, maintaining, and upgrading the software applications. The software applications are managed from a central location that is accessible through the Internet. SaaS is beneficial for applications that need web and mobile access, for applications that are not used that often, and for organizations that need to launch a web service quickly without the responsibility of operating a data center. The cloud provider maintains the SaaS service which includes the applications, data, runtime, middleware, operating system, virtualization, servers, storage, and networking facilities. The cloud provider also provides the service's security thereby monitoring the computer infrastructure for security threats.

In the IaaS service model, the cloud provider provides the computing infrastructure, such as the virtualization, servers, storage and networking facilities on demand for a customer. The customer pays for the computing resource that it uses thereby avoiding the expense and complexity of buying and maintaining these resources. The customer rents each hardware resource separately and the cloud provider is responsible for managing and maintaining those resources. The customer manages, installs, configures, and updates its own software, operating system, middleware, data, and applications.

The IaaS service is advantageous since it eliminates the expense of purchasing and maintaining the hardware resources of a datacenter. It is an economical solution for organizations that require a computing infrastructure quickly for a limited time period. The customers are responsible for managing the applications, runtime, operating systems, data, and middleware, while the cloud provider maintains the virtualization, servers, storage and networking facilities and the security services for the hardware resources.

In a PaaS environment, the cloud provider offers provisioning and hosting capabilities for a developer to create, host and deploy applications, thereby saving developers from maintaining, configuring, and managing the underlying hardware, software, and provisioning hosting capabilities. The developer's application operates on one or more virtual machines (VMs) running on top of a hypervisor in a host server. The cloud provider manages the runtime, middleware, operating system, virtualization, servers, storage and networking facilities leaving the developer to maintain its applications and data. PaaS is advantageous since it offers low infrastructure and development costs, rapid time-to-deployment, and on-demand and scalable resources.

However, in the PaaS service, the customer is responsible for the security of the application and the cloud provider is responsible for the security of the computing infrastructure. Although the cloud provider may provide traditional security controls for identity, authentication, and authorization, there still lies the potential for malicious security threats to the application that may go undetected.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An application threat detection system is used to monitor the resource usage of a hosted application in a PaaS service in order to detect anomalous behavior indicative of a security threat. A cloud provider hosts the application in a virtual machine where the application has no visibility to the physical resource consumption of the application. The application threat detection system analyzes the historical usage of the application's physical resources in order to determine the normal consumption of a physical resource by the application. Statistic models are generated that represent the normal usage of a resource by the application and then used to detect in real time any anomalous behavior. A security threat alert is provided when a statistical model indicates that the application's resource consumption is not within the normal range.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
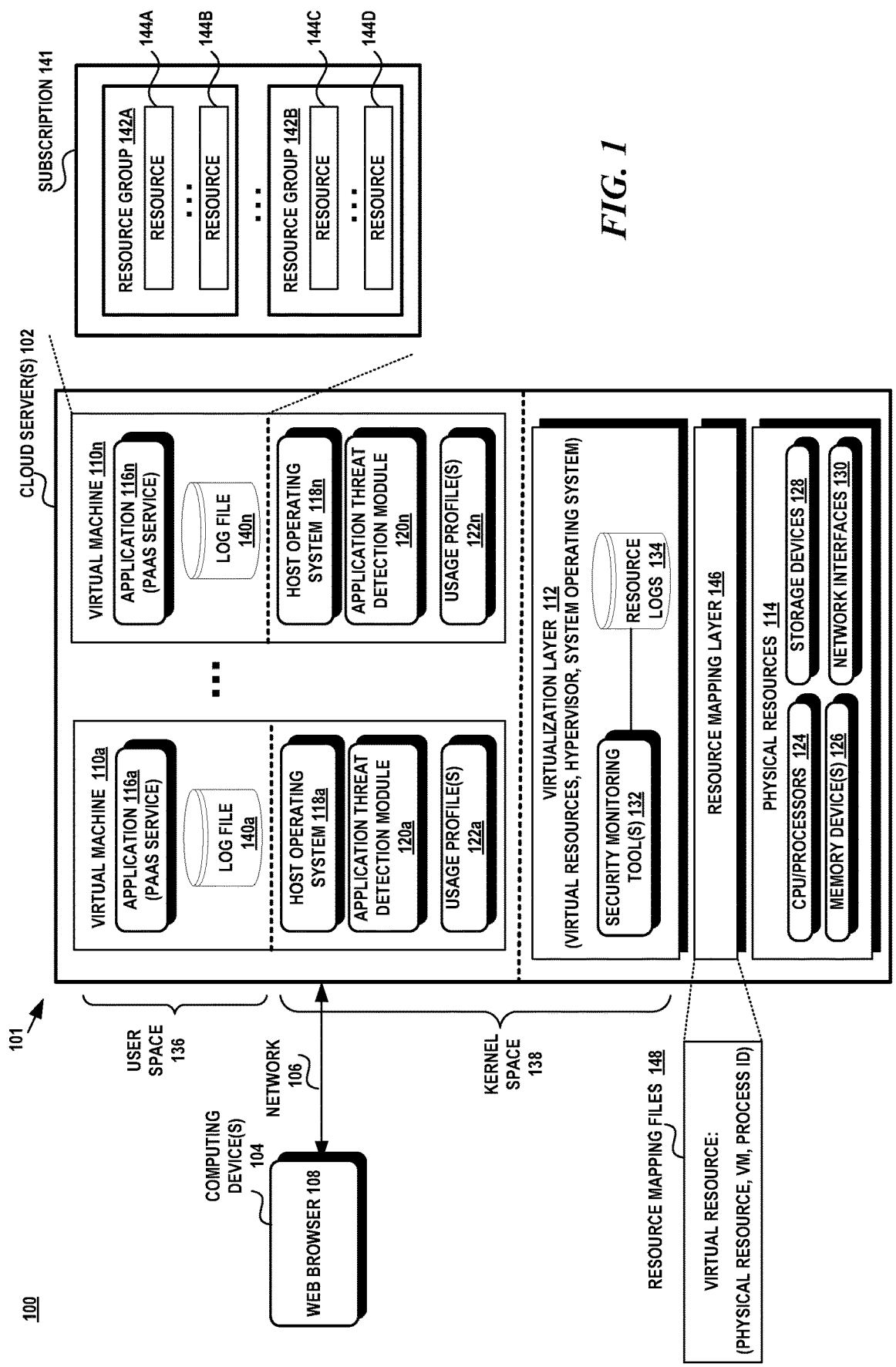
FIG. 1 is a schematic diagram illustrating an exemplary application security monitoring and detection system for a PaaS service.

The subject matter disclosed pertains to the security monitoring and detection of the anomalous behavior of an application running as a PaaS service. The cloud service provider manages the computing infrastructure or platform (e.g., runtime, operating system, middleware, virtualization, servers, storage, and networking facilities) for the developer of the application (i.e., customer, user) to develop, run, and manage the application and data with no access or visibility into the physical resources used by the application. The developer is responsible for the security of the application and its data while the cloud service provider maintains the security of the computing infrastructure.

The application or PaaS service runs on a virtual machine that is isolated from other virtual machines. There may be several instances of the application with each instance residing in a different virtual machine hosted in numerous, distinct servers. In one aspect, an application security threat detection module is provided on each virtual machine to monitor the usage behavior of the application's resources in order to detect a security threat. The application security threat detection module resides in kernel space thereby having access to and visibility to the physical resource consumption of the application.

The detection of a resource's behavior is compared with the application's typical consumption of the resource. The resource's behavior is represented by a statistic (e.g., threshold, centroid) that is used to signal a security threat. A security threat or threat is a potential attack that may lead to the misuse or disclosure of the information or resources of the application. For example, once the virtual machine is running with an open port, the application is susceptible to a brute force attack or port scanning. These attacks may be detected when the application use of the open port increases beyond its normal consumption.

The application is monitored during a designated training period to compute a mathematical model of the typical usage of the application's physical resources. The model includes a statistic to represent a normal usage value for CPU/processor usage, memory usage, average number of network packets transmitted, the maximum size of the network packets transmitted, the frequency of transmission of the network packets, and/or the number of open ports. The model also includes usage data, such as the Internet Protocol (IP) addresses of the transmitted network packets and open port numbers used during the execution of the application.

The application's historical resource usage obtained during the training period may come from various resource logs that a cloud service generates to monitor the security of the computing infrastructure. The resource logs are analyzed for each resource that each instance of an application uses in order to determine the statistic and usage data that represents the normal resource usage of an application.

It should be noted that the description of the techniques and components described herein utilizes terminology of the Azure® cloud computing service. However, this description is not constrained to this particular cloud computing service and the techniques, components and method disclosed herein are applicable to any cloud computing service.

Attention now turns to a further discussion of the system, devices, components, and methods that monitor and detect security threats for a PaaS application.

System

FIG. 1 illustrates an exemplary system 100 in which various aspects of the invention may be practiced. In one aspect, the system 100 is implemented in a cloud service 101 that includes one or more cloud servers 102 that interact with computing devices 104 of the users of the cloud service through a network 106. The computing devices 104 include a web browser 108 which facilitates communication with the one or more cloud servers 102.

A cloud service 101 is a service available on demand for users through a publicly-accessible network 106, such as the Internet. In one aspect, a cloud service 101 hosts the resources of multiple tenants. A tenant may be an organization, entity, business unit within an organization, a group of users within an organization, and the like. A tenant hosts resources for use by its customers. A tenant contains resources, such as virtual machines, applications, application programming interfaces (APIs), storage accounts, services, etc. that are grouped into a subscription. A subscription is an object that represents a folder where the resources reside. A tenant may have many subscriptions. As shown in FIG. 1, a tenant has a subscription 141 having resource groups 142A, 142B where resource group 142A contains resources 144A-144B and resource group 142B contains resources 144C-144D.

The cloud service 101 hosts the tenant's subscriptions and controls access to the resources contained within a subscription. A subscription may be fee-based or free and lasts for a designated length of time. Examples of a cloud service include without limitation, Microsoft Azure®, Google Cloud Platform™ service, iCloud®, and the like.

A resource is an entity that is managed by the cloud service, such as a virtual machine, virtual network, storage account, database, web-accessible application, and services. Resources belong to a resource group which is a logical grouping of the resources so that they can be managed as a single entity.

The cloud service 101 consists of one or more cloud servers 102. A cloud server 102 includes one or more virtual machines 110a-110n ("110"), a virtualization layer 112, a resource mapping layer 146, and physical resources 114. A virtual machine 110 is a resource that uses software to emulate a computer to run application software. The virtual machine 110 has a user space 136, where the user's applications and data run, and a kernel space 138, where the operating system-level functions run outside of the user space and are not accessible from the user space. The virtual machine 110 includes a hosted application in a PaaS computing environment 116a-116n ("116"), log files 140a-140n ("140"), a host operating system 118a-118n ("118"), an application threat detection module 120a-120n ("120"), and an application resource usage profile 122a-122n ("122").

The application hosted in the virtual machine 116 is often constructed as a web service. The activity of the application may be monitored and recorded in a log file 140. The log file 140 contains all the actions performed on a resource 144. A resource 144 writes an entry in the log file 140 each time an access and use are made to the resource 144. There may be one resource log per subscription, per resource group or per resource. An entry in a log file 140 may identify the subscription identifier, the resource group, and the actions performed on a particular resource. For example, an entry may be formatted as follows: /sub/subid/resourcegroup/RG1R2/read, where sub indicates subscription, subid indicates the subscription identifier, resourcegroup indicates a resource group, RG1R2 indicates resource group 1 and resource 2, and read indicates that a read operation was performed on resource 2 in resource group 1 of subscription identifier subid.

The application threat detection module 120 builds a usage profile 122 for the hosted application 116 from the various monitoring data collected on the cloud server. The usage profile 122 may pertain to the resource usage of a particular application or to the resource usage of the customer's applications. The usage profile 122 includes the models and usage data used to detect a security threat.

The virtual machine 110 operates in an isolated environment without access to other virtual machines, applications and resources outside of the virtual machine. The developer manages the application and has no access or visibility to the host operating system 118, the application threat detection module 120, the application resource usage profile 122, the virtualization layer 112, the resource mapping layer 146, and the physical resources 114.

The virtualization layer 112 includes the virtualized resources, a hypervisor, and the system operating system. The hypervisor creates the virtual machine and the virtualized resources used by the application. The virtualized resources are mapped to physical resources by the hypervisor and stored in resource mapping files 148 of the resource mapping layer 146. A resource mapping file 148 stores the relationship between a virtual resource and a tuple consisting of an identifier of the physical resource, the virtual machine assigned the physical resource and the process identifier that consumes the physical resource, virtual resource: <physical resource, virtual machine, process identifier>. A process is an instance of a program that is running on a computer. The process may include multiple threads of execution that perform the instructions of the program concurrently. The process identifier is a unique value that identifies the instance of the application that is running on a particular virtual machine.

The physical resources 114 include one or more CPUs or processors 124, one or more memory device 126, one or more storage devices 128, one or more applications 116, and one or more network interfaces 130. A further description of the CPUs/processors 124, memory devices 126, storage devices 128, and network interfaces 130 is described in further detail below.

The cloud server 102 has security monitoring tools 132 that collect data on the usage of the various physical resources. The data collected from the security monitoring tools 132 is stored in various resource logs 134. The security monitoring tools may include Event Tracing For Windows (ETW) which is a kernel-level tracing facility that monitors kernel or application-defined events to a log file. The kernel-level tracing facility traces events, from a configured start time to an end time, for such events as TCP/UDP events, memory page faults, file I/O events, disk I/O events, thread events, virtual memory allocation, etc. In addition, the security monitoring tools 132 may include agents that collect data from security events, such as login events, process creation, file access, etc. For example, in Azure, there is a Microsoft Monitoring Agent and an OMS Linux agent that collects data from security events. In addition, Microsoft Defender Advanced Threat Protection collects file creation, file deletion, and network events.

The data from these security monitoring tools 132 is collected into various resource logs 134. The application threat detection module 120 obtains the data from the resource logs 134 and mines the data to obtain the logged data that relates to the physical resources used by a target application.

Methods

Attention now turns to a description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 2:
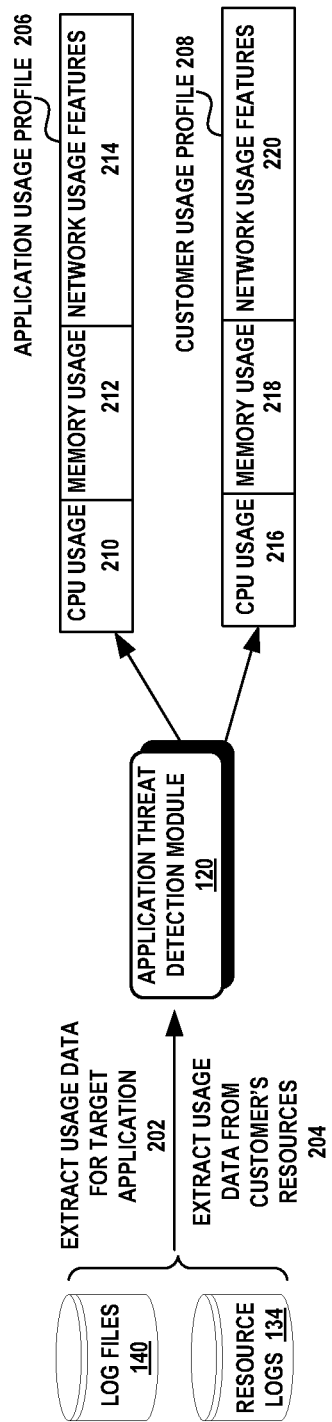
FIG. 2 is a schematic diagram illustrating an exemplary detection mechanism that utilizes an application usage profile and/or a customer usage profile to detect a security threat to a PaaS service.

Turning to FIG. 2, in one aspect, the application threat detection module 120 generates an application usage profile 206 for a specific application from resource logs of the application. During an initial training period, the resource logs from execution of the application is analyzed to extract resource usage data 202. The resource usage data 202 is then used to generate statistics representing the application's normal resource usage which is stored in an application usage profile 206.

In a second aspect, the application threat detection module 120 extracts resource usage data from all of the customer's resources 204. The resource logs from execution of the various applications of the customer is analyzed to extract usage data of all of the customer's resources. The extracted data is then used to generate statistics representing a customer's typical resource usage which is stored in a customer usage profile 208.

Figure 3:
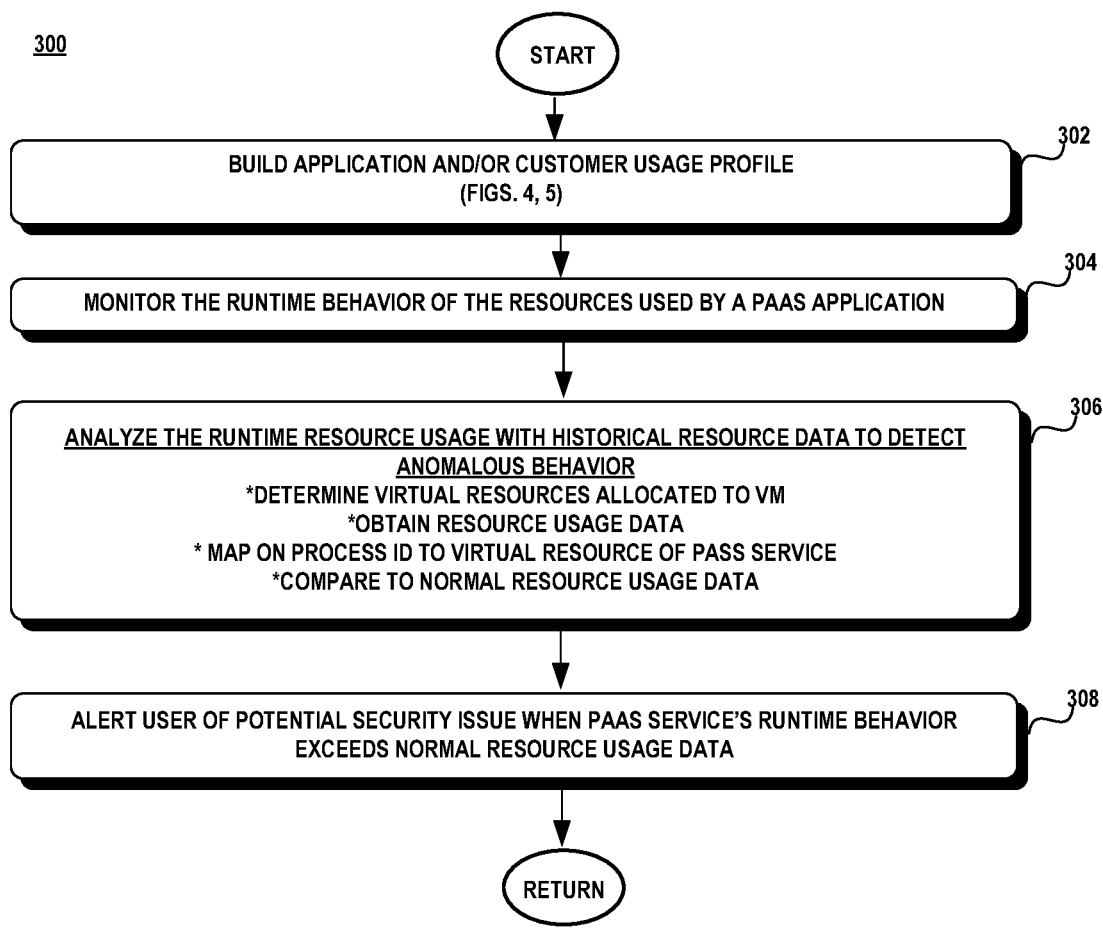
FIG. 3 is a flow chart illustrating an exemplary method of monitoring and detecting a PaaS application for security threats.
Figure 4:
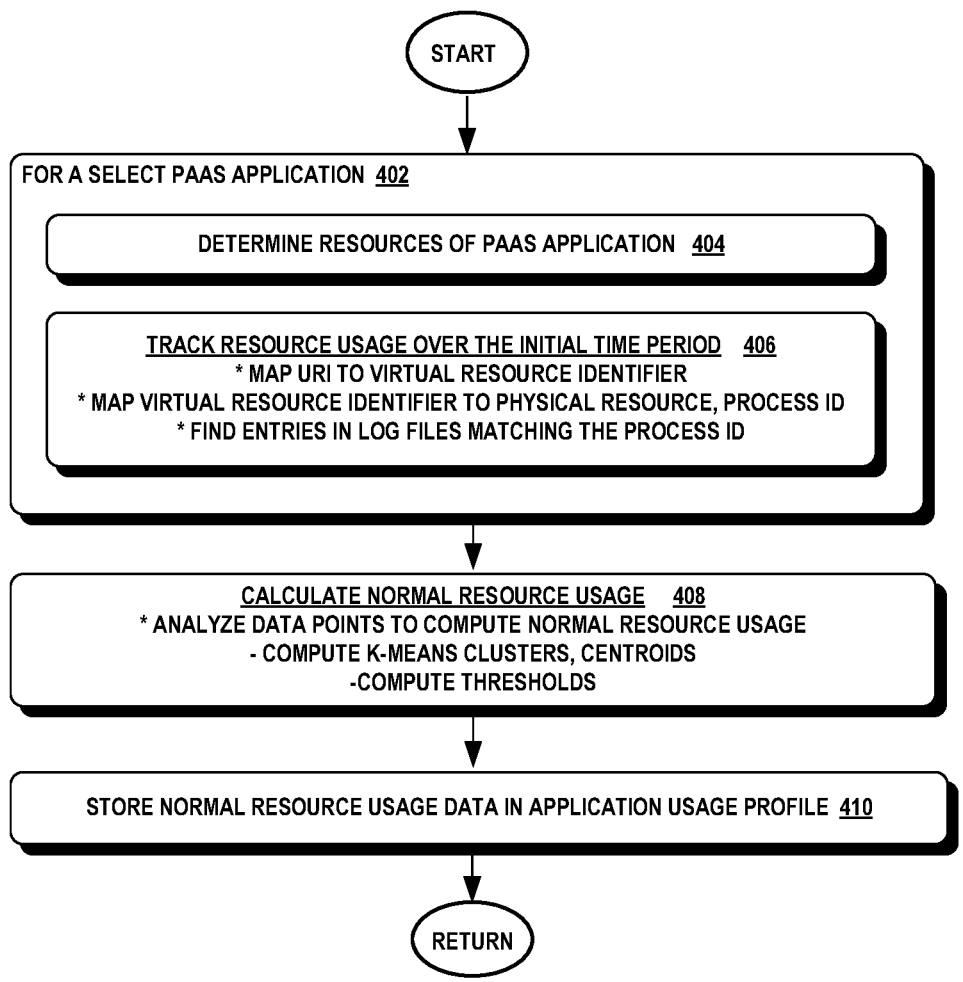
FIG. 4 is a flow chart illustrating an exemplary method of determining the normal resource usage of an application.
Figure 5:
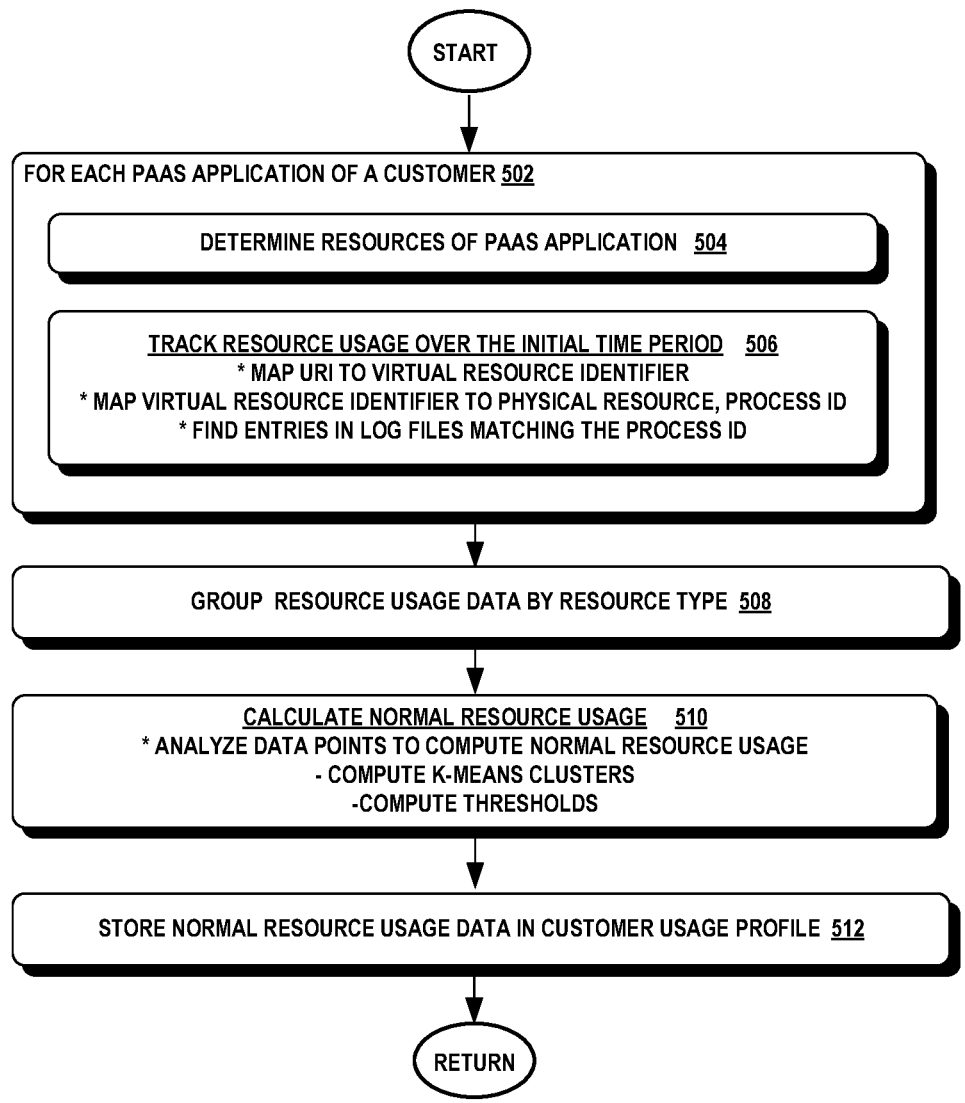
FIG. 5 is a flow chart illustrating an exemplary method of determining the normal resource usage of a customer.

FIG. 3 is an exemplary method for monitoring and detecting a security threat to a PaaS application. In one aspect, the system monitors the resource consumption of a target application to obtain historical resource usage data during an initial or training period of time. The historical resource usage data is used to create an application usage profile for the application (block 302). In a second aspect, the system monitors the resource consumption of all the resources used by the customer's applications in order to compute a customer usage profile for the customer (block 302). FIG. 4 illustrates an exemplary method for building an application usage profile and FIG. 5 illustrates an exemplary method for building a customer usage profile.

Turning to FIG. 4, the application threat detection module 120 initiates the security monitoring tools 132 to monitor the resources used in the execution of a target application during the initial training period. The historical resource usage data obtained is stored in various resource log files 134 and log files 140 during the initial training period. The resource log files may come from various sources, such as servers, networks, etc. (Collectively, block 402).

The virtual resources that are consumed by a target PaaS application are identified by the application threat detection module 120. The cloud service 101 includes a mechanism (e.g., module, API, or service) that identifies the virtual resources allocated to the virtual machine that runs an application. Each virtual resource is identified with a Uniform Resource Identifier (URI). For example, the resource identifier or URI may be in a format such as the following: /subscriptions/resourceGroups/resource-group-name/resource-type/resource-name. (Collectively, block 404).

The application threat detection module 120 maps each virtual resource consumed by the virtual machine to the physical resource and process that consumes the virtual resource. The usage data in the resource log files is relative to a physical resource and process identifier. The virtual machine that runs the application uses virtual resources. In order to obtain the application's physical resource consumption, the application threat detection module 120 maps each virtual resource consumed by the application to where the virtual resource is being used, which is the corresponding physical resource and process identifier that is using the corresponding virtual resource. The process identifier is an identifier of the process executing the application. (Collectively, block 406).

The application threat detection module 120 obtains the virtual resource identifier for each virtual resource. For example, Azure provides an API, Get Resource By ID, which returns the virtual identifier of a resource when given the resource URI. The virtual resource identifier is then mapped to its corresponding physical resource. (Collectively, block 406).

Alternatively, the cloud service may use the resource mapping files to map virtual resources to a particular physical resource. For example, an instance of the PaaS application is considered as a resource which the resource mapping layer maps to the tuple including the server identifier, virtual machine identifier and process identifier, <server identifier, virtual machine identifier, process identifier>. (Collectively, block 406).

The mapping to a physical resource includes the process identifier of the process that is using the virtual resource. The application threat detection module 120 then searches the resource log files for the process identifier to obtain the historical usage data of a resource associated with the process. (Collectively, block 406).

Once the usage data for each resource is obtained, the application threat detection module 120 computes the normal usage of the resource by an application. For resources having measurement values, such as CPU usage and memory usage, a statistic is computed to represent normal resource usage. For other resources that do not utilize measurement values, such as the IP addresses used in the application's transmission or the open port numbers used by an application, a list of those features is collected. (Collectively, block 408).

The statistic that represents the normal resource usage may be a threshold or a centroid. A threshold is a numeric value. The threshold represents a value that exceeds the normal range of values. The application threat detection module 120 analyzes the collected measurement values and finds the most frequent range of values. A threshold may be a value that exceeds the highest value or lowest value from the collected data or lies outside of a designated percentile of the collected data. (Collectively, block 408).

In another aspect, the historical usage data of each resource may be clustered. Clustering is a technique that groups together data items that are similar to each other. Measurement values for a resource that are similar to other data items in a cluster may represent normal usage behavior and those measurement values that are different from the other data items represent abnormal resource usage behavior. In one aspect, K-means clustering may be utilized. The K-means technique uses a predetermined number of clusters, K and a set of initial estimates for the cluster means, and the data set to be clustered. The means or centroids define the parameters of a model. Typically, the K-means evaluation starts with a random choice of cluster centroids or means. Each cluster is represented by its mean and each data item is assigned membership in the cluster having the nearest mean. The measurement data is used to calculate the K-means cluster centroids. Euclidean distance is used as the measure of similarity and is represented mathematically for a data point x and mean μ, as follows: Dist (x, μ)= $\sqrt{\Sigma_{i=1}^{d}(x_i-u_i)^2}$.

For those resources having measurement values, the K-means evaluation is used to generate a centroid for each cluster. There may be one or more clusters for each resource. For example, a model for a resource may have one cluster that represents normal usage and another cluster that represents abnormal usage. The Euclidean distance between the real-time values and the centroids of each cluster is used to indicate whether the resource usage represents anomalous or normal usage behavior. (Collectively, block 408).

For some physical resources, usage data is collected, such as the list of open port numbers, the list of IP addresses network packets are transmitted to, etc. The application usage profile and customer usage profile store the list of these features. The resource usage data for each resource is then stored in the application usage profile. (Collectively, block 408).

In some situations, there may be multiple instances of an application with each application instance operating in a distinct virtual machine across multiple cloud servers. In this scenario, the usage data from the resource used by each application instance is obtained. A centralized processor obtains the usage data from each process of each application instance and then analyzed to compute the normal usage behavior of the resource by the application as noted above in FIG. 4.

Turning to FIG. 5, in another aspect, the application threat detection module 120 generates resource usage data for the resources used by each application of a customer. Resources of a similar type are grouped together and a statistic is generated for the resource type. For example, disk I/O is a generic group that covers all types of virtual disks.

The resource usage of each application of a customer is tracked by first determining the resources used by each instance of each PaaS application. The application threat detection module 120 initiates monitoring each of these applications (blocks 502, 504). For each application instance, a mapping is performed to identify the physical resources used by each application instance. The mapping from virtual resource to physical resource is performed as noted above, with respect to FIG. 3 block 306, to find the process identifier in the resource log files. The historical usage data from the resource log files is then collected for each resource type (block 508).

The normal resource usage of each resource type is then computed as noted above with respect to FIG. 4, block 410 (block 510), and the resulting statistic is stored in the customer usage profile (block 512).

Turning back to FIG. 3, once the resource usage data for each application or customer is computed, the application threat detection module 120 starts to monitor the runtime resource usage of the application or customer (block 304). The application threat detection module 120 obtains the runtime usage data from the resource logs at periodic intervals and compares the runtime usage data from each resource with the resource usage data stored in the application usage profile for the application or the customer usage profile (block 306).

The application threat detection module 120 obtains the virtual identifiers of the virtual resources allocated to the virtual machine running the application. The runtime usage data contained in a resource log contains runtime usage data identified by a physical resource identifier and a process identifier. The physical resource is mapped to its corresponding virtual resource identifier and when it matches the virtual resource identifier of a virtual resource used by the application, the runtime usage data is extracted. (Collectively, block 306).

The runtime usage data is then compared with the normal usage data stored in the application usage profile or customer usage profile. When the comparison indicates that the value is out of the normal range for the resource, the application threat detection module 120 alerts the developer of the application of a potential security breach. (Collectively, block 308).

Exemplary Operating Environment

Figure 6:
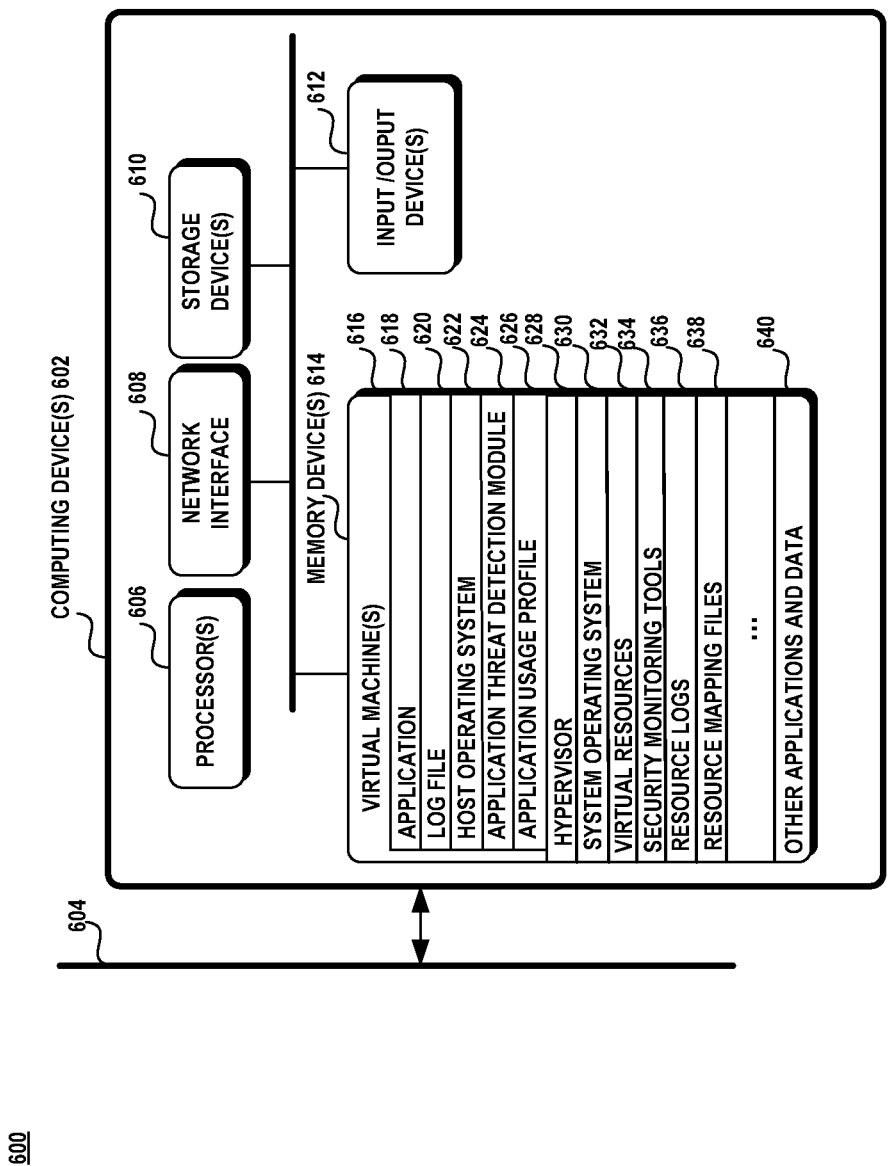
FIG. 6 is a block diagram illustrating an exemplary operating environment.

Attention now turns to a discussion of an exemplary operating environment 600. FIG. 6 illustrates an exemplary operating environment 600 of a cloud computing service having several computing devices 602. A computing device 602 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 600 may be configured in a network environment, a distributed environment, a multi-processor environment, or a stand-alone computing device having access to remote or local storage devices.

A computing device 602 may include one or more processors 606, one or more network interfaces 608, one or more storage devices 610, one or more input/output devices 612, and one or more memory devices 614. A processor 606 may be any commercially available or customized processor and may include dual microprocessors and multi-processor architectures. A network interface 608 facilitates wired or wireless communications between the computing device 602 and other devices. A storage device 610 may be computer-readable medium that does not contain propagating signals, such as modulated data signals transmitted through a carrier wave. Examples of a storage device 610 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 610 in the computing device 602. The input/output devices 612 may include a keyboard, mouse, pen, voice input device, touch input device, display, speakers, printers, etc., and any combination thereof.

A memory device 614 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 614 may also include one or more external storage devices or remotely located storage devices that do not pertain to propagated signals, such as modulated data signals transmitted through a carrier wave.

The memory device 614 may contain instructions, components, and data. A component is a software program that performs a specific function and is otherwise known as a module, program, component, and/or application. The memory device 614 may include one or more virtual machines 616, with each virtual machine including one or more applications 618, a log file 620, a host operating system 622, an application threat detection module 624, and an application usage profile 626. The memory device 614 also includes a hypervisor 628, a system operating system 630, virtual resources 632, security monitoring tools 634, resource logs 636, resource mapping files 638, and other applications and data 640.

A computing device 602 may be communicatively coupled via a network 606. The network 606 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 606 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

A system is disclosed having one or more processors; and a memory that stores one or more programs that are configured to be executed by the one or more processors, the one or more programs including instructions that: host an application as a Platform-as-a-Service (PaaS) web service in a virtual machine using virtual resources, the PaaS web service unaware of physical resources associated with the virtual resources; obtain an application usage profile for the PaaS web service, the application usage profile having one or more statistics, a statistic representing normal consumption of a physical resource used by the PaaS web service; monitor runtime usage of a first physical resource during execution of the PaaS web service; correlate the first physical resource to a corresponding virtual resource used during operation of the PaaS web service via a process identifier of the PaaS web service; compare the runtime usage of the first physical resource with a corresponding statistic; and upon the comparison indicating an anomaly, initiate a warning of the anomaly.

In an aspect, the one or more programs include further instructions that: obtain historical resource consumption of the PaaS web service; derive a threshold for one or more of the physical resources consumed by the PaaS web service; and store the threshold in the application usage profile for the PaaS web service. In an aspect, the one or more programs include further instructions that: obtain historical resource consumption of the PaaS web service; cluster the historical resource consumption into one or more clusters for the first physical resource; compute a centroid for the first physical resource; and store the centroid in the application usage profile for the PaaS web service.

In an aspect, the application usage profile includes one or more of processor consumption, memory consumption, number and types of disk I/O events, number of network packets transmitted, frequency of network packets transmitted, largest size of network packets transmitted, Internet Protocol (IP) addresses used in network packets transmitted, or identity of open ports. In an aspect, the statistic includes a threshold for the first physical resource and the one or more programs include further instructions to detect when the threshold for the first physical resource is exceeded during runtime usage of the PaaS web service.

In an aspect, the one or more programs include further instructions that: detect the anomaly when the runtime usage of the first physical resource exceeds a distance from a centroid representing normal usage consumption of the first physical resource. In an aspect, the statistic is derived from runtime usage of the first physical resource during multiple instances of the PaaS web service. In an aspect, the multiple instances of the PaaS web service operate on different virtual machines in different servers.

A method is disclosed comprising: configuring an application as a Platform as a Service (PaaS) web service in a virtual machine with virtual resources, wherein the PaaS web service is isolated from identity of physical resources consumed by the PaaS web service; during a training period, monitoring usage of the physical resources consumed by the PaaS web service; correlating the virtual resources used by the application to corresponding physical resources using a process identifier of a process hosting an instance of the PaaS web service; generating a mathematical model of normal resource consumption of at least one physical resource consumed by the PaaS web service; using the mathematical model during runtime execution of the PaaS web service to detect abnormal behavior in runtime resource consumption of the at least one physical resource by the PaaS web service; and generating an alert when the abnormal behavior is detected.

In an aspect, the method further comprises: monitoring resource usage of the PaaS web service across all instances of the PaaS web service. In an aspect, the method further comprises: monitoring processor consumption and memory consumption of the PaaS web service. In an aspect, the method further comprises: monitoring features of network usage of the PaaS web service, the features including a number of network packets transmitted, sizes of the network packets transmitted, open ports, and Internet Protocol (IP) addresses used.

In an aspect, the method further comprises monitoring features of disk I/O usage of the PaaS web service, the features including identity of files accessed and a number of I/O operations made. In an aspect, the mathematical model of the normal resource consumption of the at least one physical resource consumed by the PaaS web service is derived from historical resource usage of the at least one physical resource by the PaaS web service during the training period. In an aspect, the mathematical model of normal resource consumption of the at least one physical resource consumed by the PaaS web service is derived from clustering historical resource usage of the at least one physical resource by the PaaS web service during the training period.

A device is disclosed having one or more processors and a memory. The memory includes a virtual machine configured to: execute a Platform as a Service (PaaS) web service in the virtual machine, the PaaS web service utilizing virtual resources with no visibility to associated physical resources; obtain normal usage data of the physical resources used by the PaaS web service; extract runtime usage data of at least one physical resource used by the PaaS web service by mapping a virtual resource corresponding to the at least one physical resource through a process identifier of a process running an instance of the PaaS web service application on the virtual machine; and determine a security threat when the runtime usage data of the at least one physical resource exceeds the normal usage data of the at least one physical resource.

In an aspect, the virtual machine is further configured to: analyze historical resource usage data of a first physical resource used by the PaaS web service to generate a threshold; and detect the security threat when the runtime usage data for the first physical resource exceeds the threshold. In an aspect, the virtual machine is further configured to: analyze historical resource usage data of the first physical resource to generate a centroid representing a measurement value of normal behavior of the first physical resource when used by the application; and detect the security threat when the runtime usage data for the first physical resource exceeds a distance from the centroid.

In an aspect, the normal usage data represents processor consumption, memory consumption, number of network packets transmitted, frequency of network packets transmitted, number of disk I/O events, largest size of network packets transmitted, Internet Protocol (IP) addresses used in network packets transmitted, and/or identity of open ports. In an aspect, the historical usage data is derived from runtime usage of the physical resources across multiple instances of the PaaS web service.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A system comprising:
one or more processors; and
a memory that stores one or more programs that are configured to be executed by the one or more processors, the one or more programs including instructions to perform acts that:
host an application as a Platform-as-a-Service (PaaS) web service in a virtual machine using virtual resources, the PaaS web service unaware of physical resources associated with the virtual resources, a virtual resource associated with a virtual resource identifier;
obtain an application usage profile for the PaaS web service, the application usage profile having a statistic representing normal consumption of a physical resource used by the PaaS web service;
monitor runtime usage of the physical resources of the virtual machine during execution of the PaaS web service, wherein execution of the PaaS web service is represented by a process identifier;
map a virtual resource identifier of a first virtual resource used in the PaaS web service to a first physical resource identifier;
obtain the runtime usage of the first physical resource during execution of the PaaS web service using the first physical resource identifier and the process identifier;

obtain the statistic corresponding to the first physical resource from the application usage profile for the PaaS web service;
compare the runtime usage of the first physical resource with the statistic corresponding to the first physical resource and the PaaS service; and
upon the comparison indicating an anomaly, initiate a warning of the anomaly.

2. The system of claim 1, wherein the one or more programs include further instructions to perform acts that:
obtain historical resource consumption of the PaaS web service;
derive a threshold for the first physical resources consumed by the PaaS web service; and
store the threshold in the application usage profile for the PaaS web service.

3. The system of claim 1, wherein the one or more programs include further instructions to perform acts that:
obtain historical resource consumption of the PaaS web service;
cluster the historical resource consumption into one or more clusters for the first physical resource;
compute a centroid for the first physical resource for each cluster; and
store the centroids in the application usage profile for the PaaS web service.

4. The system of claim 1, wherein the application usage profile includes one or more of processor consumption, memory consumption, number and types of disk I/O events, number of network packets transmitted, frequency of network packets transmitted, largest size of network packets transmitted, Internet Protocol (IP) addresses used in network packets transmitted, or identity of open ports.

5. The system of claim 1,
wherein the statistic includes a threshold for the first physical resource,
wherein the one or more programs include further instructions to detect when the threshold for the first physical resource is exceeded during runtime usage of the PaaS web service.

6. The system of claim 1, wherein the one or more programs include further instructions to perform acts that:
detect the anomaly when the runtime usage of the first physical resource exceeds a distance from a centroid representing normal usage consumption of the first physical resource.

7. The system of claim 1, wherein the statistic is derived from runtime usage of the first physical resource during multiple instances of the PaaS web service.

8. The system of claim 7, wherein the multiple instances of the PaaS web service operate on different virtual machines in different servers.

9. A computer-implemented method, comprising:
configuring an application as a Platform as a Service (PaaS) web service in a virtual machine with virtual resources, wherein the PaaS web service is isolated from identity of physical resources consumed by the PaaS web service;
during a training period, monitoring usage of the physical resources consumed by the PaaS web service and generating a model of a normal resource consumption for a first physical resource of the PaaS web service;
monitoring runtime usage of the physical resources of the virtual machine during execution of the PaaS web service, wherein execution of the PaaS web service is represented by a process identifier;
mapping a virtual resource identifier of a first virtual resource used in the PaaS web service to a first physical resource identifier;
obtaining the runtime usage of the first physical resource during execution of the PaaS web service using the first physical resource identifier and the process identifier;
detecting an abnormal behavior of the PaaS web service from a comparison of the runtime usage of the first physical resource with the model of the normal resource consumption for the first physical resource of the PaaS web service; and
generating an alert when the abnormal behavior is detected.

10. The computer-implemented method of claim 9, further comprising:
monitoring resource usage of the PaaS web service across all instances of the PaaS web service.

11. The computer-implemented method of claim 9, further comprising:
monitoring processor consumption and memory consumption of the PaaS web service.

12. The computer-implemented method of claim 9, further comprising:
monitoring features of network usage of the PaaS web service, the features including a number of network packets transmitted, sizes of the network packets transmitted, open ports, and Internet Protocol (IP) addresses used.

13. The computer-implemented method of claim 9, further comprising:
monitoring features of disk I/O usage of the PaaS web service, the features including identity of files accessed and a number of I/O operations made.

14. The computer-implemented method of claim 9, wherein the model of the normal resource consumption of the first physical resource consumed by the PaaS web service is derived from historical resource usage of the first physical resource by the PaaS web service during the training period.

15. The computer-implemented method of claim 9, wherein the model of normal resource consumption of the first physical resource consumed by the PaaS web service is derived from clustering historical resource usage of the first physical resource by the PaaS web service during the training period.

16. A device, comprising:
one or more processors and a memory;
the memory including a virtual machine configured to perform acts that:
execute a Platform as a Service (PaaS) web service in the virtual machine, the PaaS web service utilizing virtual resources with no visibility to associated physical resources, wherein execution of the PaaS web service is represented by a process identifier;
monitor runtime usage of the physical resources during execution of the PaaS web service;
map a virtual resource identifier of a first virtual resource used in the execution of the PaaS web service to a first physical resource identifier;
obtain normal usage data of the first physical resource used by the PaaS web service;
extract runtime usage data of the first physical resource used by the PaaS web service using the first physical resource identifier and the process identifier of the PaaS web service executing on the virtual machine;

compare the runtime usage data of the first physical resource with the normal usage data of the first physical resource; and determine a security threat when the runtime usage data of the first physical resource exceeds the normal usage data of the first physical resource.

17. The device of claim 16, wherein the virtual machine is further configured to perform acts that:

analyze historical resource usage data of the first physical resource used by the PaaS web service to generate a threshold; and detect the security threat when the runtime usage data for the first physical resource exceeds the threshold.

18. The device of claim 16, wherein the virtual machine is further configured to perform acts that:

analyze historical resource usage data of the first physical resource to generate a centroid representing a measurement value of normal behavior of the first physical resource when used by the application; and detect the security threat when the runtime usage data for the first physical resource exceeds a distance from the centroid.

19. The device of claim 16, wherein the normal usage data represents processor consumption, memory consumption, number of network packets transmitted, frequency of network packets transmitted, number of disk I/O events, largest size of network packets transmitted, Internet Protocol (IP) addresses used in network packets transmitted, and/or identity of open ports.

20. The device of claim 16, wherein the historical usage data is derived from runtime usage of the physical resources across multiple instances of the PaaS web service.

* * * * *